United States Patent
Surjaatmadja et al.

(10) Patent No.: US 10,628,744 B2
(45) Date of Patent: Apr. 21, 2020

(54) BOOLEAN ALGEBRA FOR CLAIM MAPPING AND ANALYSIS

(71) Applicant: Halliburton Energy Services, Inc., Houston, TX (US)

(72) Inventors: Jim B. Surjaatmadja, Duncan, OK (US); James Douglas Funkhouser, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 1 day.

(21) Appl. No.: 15/114,521

(22) PCT Filed: Apr. 2, 2014

(86) PCT No.: PCT/US2014/032667
§ 371 (c)(1),
(2) Date: Jul. 27, 2016

(87) PCT Pub. No.: WO2015/152915
PCT Pub. Date: Oct. 8, 2015

(65) Prior Publication Data
US 2016/0342894 A1    Nov. 24, 2016

(51) Int. Cl.
*G06N 5/02* (2006.01)
*G06F 17/10* (2006.01)
*G06Q 50/00* (2012.01)
*G06F 17/18* (2006.01)
*G06Q 50/18* (2012.01)

(52) U.S. Cl.
CPC ............. *G06N 5/02* (2013.01); *G06F 17/10* (2013.01); *G06F 17/18* (2013.01); *G06Q 50/00* (2013.01); *G06Q 50/184* (2013.01)

(58) Field of Classification Search
CPC ................................ G06N 5/02; G06F 17/10
See application file for complete search history.

(56) References Cited

U.S. PATENT DOCUMENTS 6,430,552 B1 *   8/2002   Corston-Oliver ..... G06F 16/242
7,908,263 B1     3/2011   Paiz
(Continued)

FOREIGN PATENT DOCUMENTS

EP   1328079 A1   7/2003
EP   2487599 A1   8/2012

OTHER PUBLICATIONS

Creignou, Nadia, Sanjeev Khanna, and Madhu Sudan. Complexity classifications of boolean constraint satisfaction problems. Society for Industrial and Applied Mathematics, 2001.*
(Continued)

*Primary Examiner* — Vincent Gonzales
*Assistant Examiner* — Kevin W Figueroa
(74) *Attorney, Agent, or Firm* — John W. Wustenberg; Parker Justiss, P.C.

(57) ABSTRACT

Some aspects of this specification describe the use of Boolean algebra for patent claim mapping and analysis. In some instances, characteristics of a collection of technologies are represented as binary variables, and each of the technologies has a respective subset of the characteristics. The collection of technologies is represented as a collection of binary functions, and each binary function includes a respective subset of the binary variables. A patent claim is generated based on inverting the binary functions according to Boolean algebra.

20 Claims, 5 Drawing Sheets

(56) References Cited

U.S. PATENT DOCUMENTS

| | | | |
|---|---|---|---|
| 8,412,659 B2 | 4/2013 | Avasarala et al. | |
| 2007/0219816 A1* | 9/2007 | Van Luchene | G06Q 10/06 705/80 |
| 2010/0185943 A1 | 7/2010 | Dingding et al. | |
| 2010/0293162 A1 | 11/2010 | Odland et al. | |
| 2012/0226650 A1* | 9/2012 | Witchey | G06N 5/04 706/50 |
| 2013/0019215 A1 | 1/2013 | Swann | |
| 2014/0006294 A1 | 1/2014 | Jae-Bok et al. | |
| 2014/0086039 A1* | 3/2014 | Mantri | H04W 28/18 370/201 |
| 2015/0186504 A1* | 7/2015 | Gorman | G06F 16/24522 707/752 |
| 2016/0048936 A1* | 2/2016 | Perkowski | G06Q 50/184 705/310 |

OTHER PUBLICATIONS

Surjaatmadja, "The Transformation and Implementation of NOR Logic Circuits," Paper No. P76-44, Fluid Power Research Conference, Oct. 1976, 7 pages.

Boolean Algebra—Wikipedia, accessed online at http://en.wikipedia.org/Boolean_algebra, version last modified Mar. 17, 2014, 19 pages.

E.C. Fitch et al., Introduction to Fluid Logic, Chapter 2—Boolean Algebra, 1978, pp. 10-39.

Pressman, "Patent It Yourself: Your Step-by-Step Guide to Filing at the U.S. Patent Office," 15th Edition, Apr. 2011, pp. 139-144 and 231-232.

Surjaatmadja, "A Computer-Oriented Method for Complementing Boolean Expressions" Paper No. P75-59, Fluid Power Research Conference, Oklahoma State University, Oct. 7-8, 1975, 8 pages.

Surjaatmadja, "A Numerical Approach to Boolean Simplification and Hazard Detection" Paper No. P73-FL-3, Seventh Annual Fluid Power Research Conference, Stillwater, Oklahoma State, Oct. 1973, 5 pages.

Surjaatmadja, "An Algebra for Switching Circuits," IEEE Transactions on Computers, vol. C-30, No. 8, Aug. 1981, 5 pages.

Surjaatmadja, "TABII—Revised Program and User's Guide for the Simplification and Static Hazard Elimination of Colossal Boolean Expressions," Report No. R75-2, Fluid Power Research Conference, Oklahoma State University, Oct. 7-8, 1975, 11 pages.

PCT International Search Report and Written Opinion of the International Searching Authority, PCT/US2014/032667, dated Dec. 26, 2014, 9 pages.

* cited by examiner

BOOLEAN ALGEBRA FOR CLAIM MAPPING AND ANALYSIS

BACKGROUND

This application is a U.S. National Phase Application under 35 U.S.C. § 371 and claims the benefit of priority to International Application Serial No. PCT/US2014/032667, filed on Apr. 2, 2014, the contents of which are hereby incorporated by reference.

This instant specification relates to using Boolean algebra for patent claim mapping and analysis.

Boolean algebra provides a mathematical framework for manipulating variables. In some applications, Boolean logic is implemented by logic gates that act on one or more binary input variables and produce one or more binary output variables according to a truth table. For example, Boolean logic has been used extensively in computing and electronics applications.

DETAILED DESCRIPTION

The following description relates to systems and techniques for applying a mathematical approach to patent claim mapping and analysis. It is generally known that patent claims can be analyzed using aspects of Boolean logic, for example, to analyze whether a specific apparatus includes all the elements recited in a patent claim. The systems and techniques described here can be used to solve problems in the application of Boolean logic to patent claim mapping and analysis.

Patent claims typically recite a collection of features that are being claimed, with the features being linguistically grouped or modified by conjunctions, punctuation, etc. The language in a patent claim can encompass or exclude portions of an intellectual property space. In some cases, the intellectual property space can be analyzed using Boolean algebra.

Boolean algebra can provide rules of syntax for expressing logical statements. Patent claim language, in a grammatical rather than mathematical context, also includes syntactical logic. In some instances, patent claim language can be translated or transformed into Boolean algebraic equations that may be further manipulated and analyzed to identify areas of patent coverage or areas lacking patent coverage. Such analysis may be used to identify or construct expressions to cover identified combinations and provide a competitive or strategic advantage. For example, a new patent application can be filed based on the identified combinations to fill a gap in intellectual property coverage, or to strategically block a competitor from filling a gap identified in intellectual property coverage.

Figure 1:
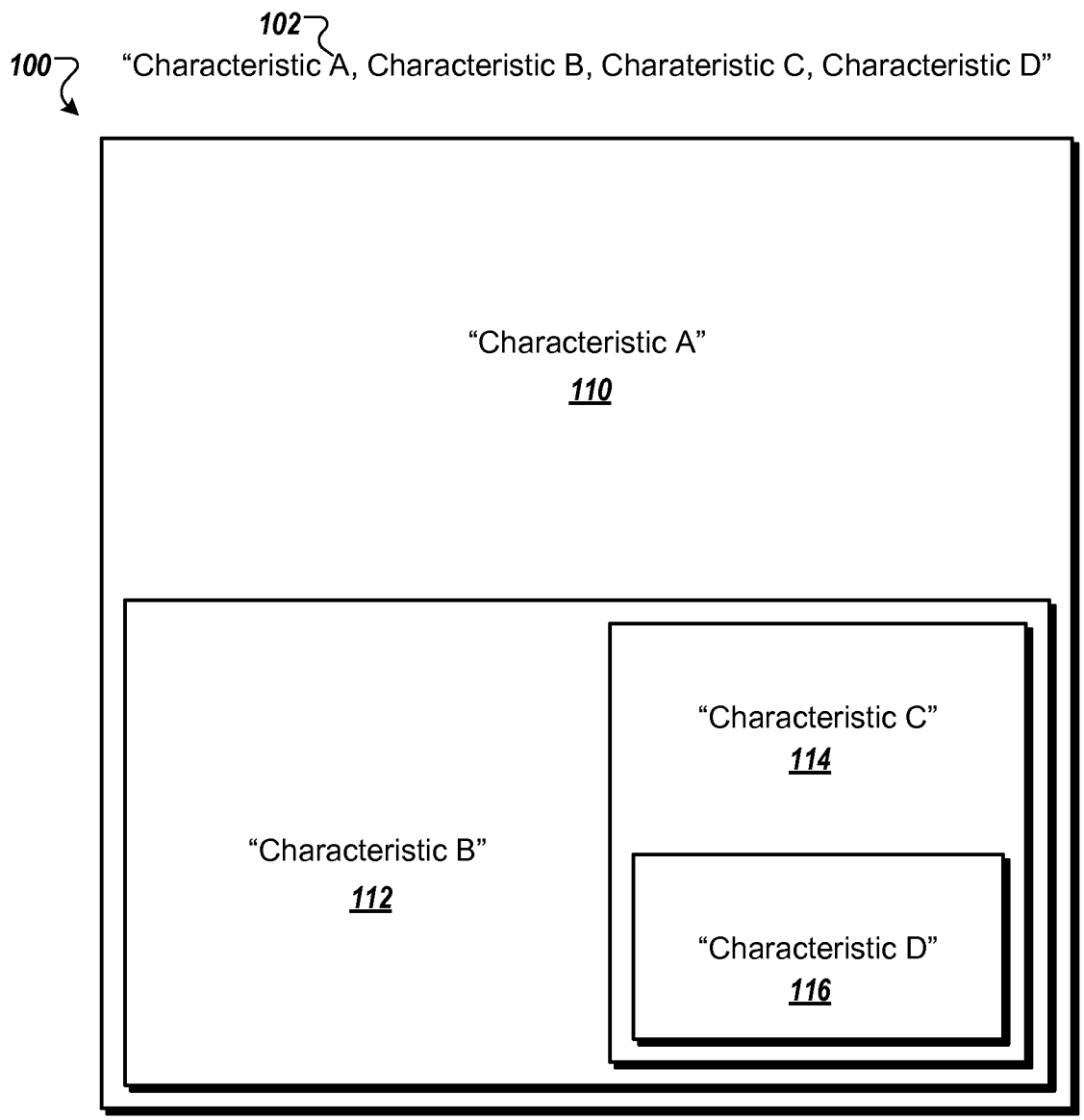
FIG. 1 is a schematic diagram of an example patent claim expressed in a Boolean space.

FIG. 1 is a conceptual diagram of an example legal claim expressed in a Boolean space 100. In the example shown, the Boolean space 100 is a binary system. In a binary system, binary variables can have one of two possible values, typically expressed as "1" and "0" (or equivalently "on" and "off"). A collection of binary variables can form a binary function, which can be represented in the Boolean space 100. In some examples, a binary function can be used to represent a technology in the Boolean space 100, where each binary variable in the binary function represents a characteristic of the technology. Boolean algebraic operations can be used to analyze the technology or other technologies in the Boolean space.

In the example of FIG. 1, the Boolean space 100 represents a collection of relevant elements 102 (e.g., "characteristic A, characteristic B, characteristic C, characteristic D"). As a specific example, the Boolean space 100 can represent a carbide valve seat in a pump that is used for fracturing. In some implementations, the relevant elements 102 can be ranked or ordered. For example, characteristic "B" may be a narrowing feature of characteristic "A", and therefore be ranked or ordered lower than characteristic "A". In another example, a collection of elements "Valve Seat Carbide Pump Fracturing" may be obtained from claim language that describes a valve seat that is made of carbide and is included in a pump used for fracturing. Since the example claim focuses on a valve seat rather than a pump, the term "Valve Seat" can be given a higher Boolean or binary ordinal position than "Pump".

In the illustrated example, the technology is primarily characterized by characteristic "A" (e.g., valve seats), and this feature is represented as a conceptual Boolean space 110. The space 110 is conceptually subdivided into two groups; items having characteristic "A" and characteristic "B" (e.g., carbide), and items having characteristic "A" but not characteristic "B" (e.g., valve seats that are made of carbide and those that are not). The characteristic "B" feature is represented as a conceptual Boolean space 112 that subdivides the space 110. The space 112 is subdivided into items having characteristic "C" (e.g., used in pumps), as represented by a conceptual Boolean space 114, and those that do not (e.g., carbide valve seats that are used in pumps, and carbide valve seats that are not used in pumps). The space 114 is subdivided into items having characteristic "D" (e.g., used for fracturing), as represented by a conceptual Boolean space 116, and those that do not include characteristic "D" (e.g., pumps that are used for fracturing, and pumps that are not).

In the illustrated example, of the conceptual Boolean space 110 that includes all items having characteristic "A" (e.g., valve seats), only the space 116 covers the combination of the characteristics A, B, C, and D (e.g., a carbide valve seat in a pump that is used for fracturing). In this example, the rest of the space 110 outside the space 116 therefore conceptually represents other items having characteristic "A" that are not covered by the claim. In some implementations, the Boolean space 100 can be analyzed to determine combinations of features that may be available to be claimed. For example, the space 100 can be analyzed to determine a patent claim for an item having characteristic "A" but not characteristic "D" when applied to characteristic "C" when applied to characteristic "B" (e.g., a carbide valve seat for use in pumps not used for fracturing).

Figure 2:
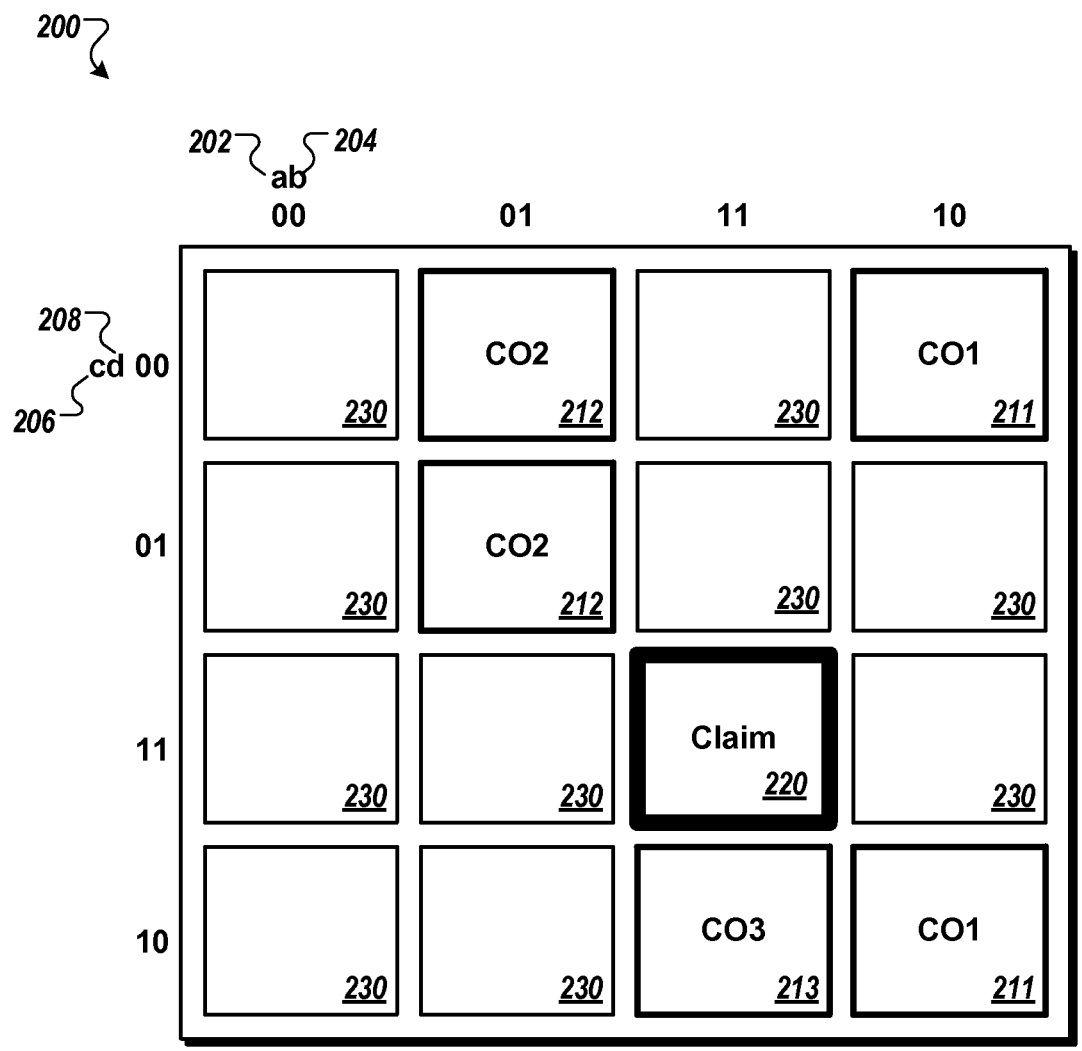
FIG. 2 is an example Karnaugh map based on the diagram shown in FIG. 1.

FIG. 2 is an example Karnaugh map 200 based on the diagram shown in FIG. 1. In the Karnaugh map 200, features and limitations of a patent claim or other legal language are converted to symbolic representations. Continuing the previous example of the claim for a carbide valve seat for use in pumps used for fracturing, characteristic "A" (e.g., the feature of "carbide") is assigned to a Boolean variable "a" 202, characteristic "B" (e.g., the feature of a valve seat) is assigned to a Boolean variable "b" 204, characteristic "C" (e.g., the feature of a "pump") can be assigned to a Boolean variable "c" 206, and characteristic "D" (e.g., the element of "fracturing") is assigned to a Boolean variable "d" 208.

Symbolically, two of the variables 202-208 expressed directly next to each other in a Boolean equation means "AND". For example, "(ab)" means "a AND b", or in the current example can mean "an item that is a valve seat and is carbide". Two of the variables 202-208 separated by an addition symbol in a Boolean equation means "OR". For example, "(a+b)" can mean "a OR b". A prime symbol can be added to a variable to mean "NOT". For example, "(b')" means "NOT b", or in the current example can mean "NOT carbide".

For example, Company #1 may have patented a carbide bearing, which in the context of the example carbide valve seat for fracturing pumps can be represented as "(ab'd')", which can mean "Carbide, not Valve Seat, and not Fracturing". The conceptual spaces covered by Company #1 are represented in the map 200 by the spaces 211.

Continuing the example above, a Company #2 may have patent rights to "(a'bc')", through a patent claim drawn to a valve seat that is not carbide, is not part of a pump, and may be used for fracturing. The conceptual spaces covered by Company #2 are represented in the map 200 by the spaces 212. A Company #3 may have rights to "(abcd)" through a claim drawn to a valve seat that is carbide, and is part of a pump that is not used for fracturing. The conceptual spaces covered by Company #3 are represented in the map 200 by the spaces 213. Together, the three companies in this example have legal coverage in conceptual spaces 211, 212, 213. In some examples, conceptual spaces such as the spaces 211, 212, 213 may overlap in various regions, and leave gaps in others.

In Boolean algebraic notation, the space claimed by the three companies can be represented as:

Claim=(ab'd')+(a'bc')+(abcd')
Conversely, unclaimed space can be represented as:
Unclaimed=Claim'=(a'+b+d)(a+b'+c)(a'+b'+c'+d)
Unclaimed=(a'b'+a'c+ab+bc+ad+b'd+cd}(a'+b'+c'+d)
Unclaimed=a'b'+a'c+b'd+abc'+ad+cd The resulting equation can be translated back to construct a collection of expressions such as, "not carbide, not valve seat", "not carbide pump", "not valve seat, fracturing" (e.g., use of carbide in a fracturing pump), "carbide valve seat for fracturing" (e.g., the pump is not needed), "carbide for fracturing", and "pump for fracturing". In some implementations, some of the identified expressions may not be logical combinations in the context of their application. For example, in the context of the example valve seat, the combination "not carbide, not valve seat" space may be excluded since "not valve seat" is outside the target "valve seat" claim space (e.g., outside the conceptual Boolean space 101 of FIG. 1). In this example, the solution "pump for fracturing" can also be excluded because it uses the "pump" as its primary constraint rather than the "valve seat".

The collection of features used in the example of FIG. 1 can also be mapped to the Karnaugh map 200, and is represented by the conceptual Boolean space 220. The map 200 can be analyzed to determine that while the spaces 211, 212, 213 and 220 are covered, a collection of conceptual Boolean spaces 230 are not covered by the claims of Company #1, Company #2, and Company #3, or the claim used in the example of FIG. 1.

In some implementations, the map 200 can be used to confirm that a collection of claimed features do not overlap the combinations of features in other known claims. For example, the map 200 can be used to confirm that the combination of features represented by the space 220 does not overlap the combinations represented by the spaces 211, 212, and 213.

The combinations of features represented by the space 220 and the spaces 230 also represent the solutions to the "unclaimed" Boolean equation example above. In some implementations, inverted Boolean equations (e.g., the "unclaimed" equation above) or the map 200 can be used to identify one or more combinations of features that are not covered by other known claims (e.g., loopholes, work-arounds). For example, the map 200 can be analyzed to determine that the combinations of features represented by the space 220 and the spaces 230 are not anticipated by the known prior art. In another example, the space 220 and the spaces 230 can represent solutions to the "unclaimed" Boolean equation example of FIG. 1. In some cases, expanding one or more claims to cover all the spaces 230 may provide better patent protection. For example, claims covering only a smaller subspace (e.g., only "cd" and "ad") may allow work-arounds or loopholes in the claim.

In the application of Boolean logic to the analysis of claim language, boundaries between two different boxes of the Karnaugh map 200, such as between (a'b') and (ad), can represent gaps or loopholes in terms of legal coverage. Such gaps or loopholes can represent concepts that can be protected by additional claims in some instances.

While the Karnaugh map 200 is illustrated as a two-dimensional square, Karnaugh maps typically wrap around on themselves. For example, claim a'b' and ad have a common boundary at the far left and right edges of the map 200. In some embodiments, such a relationship may be illustrated as a cylinder. Similarly, the very top and bottom edges of the map 200 share a common boundary, and in some embodiments such a relationship can cause the cylinder to be represented as a donut or torus shape.

Figure 3A:
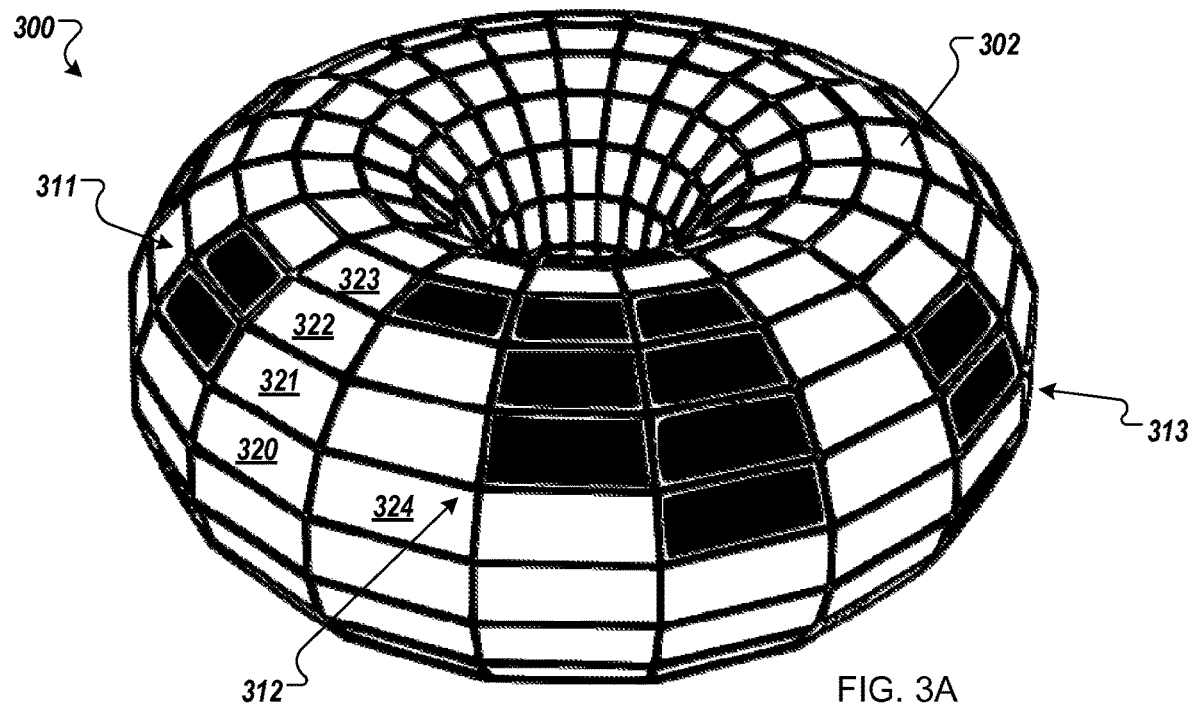
FIGS. 3A-3B are diagrams of an example Boolean space expressed as a torus.
Figure 3B:
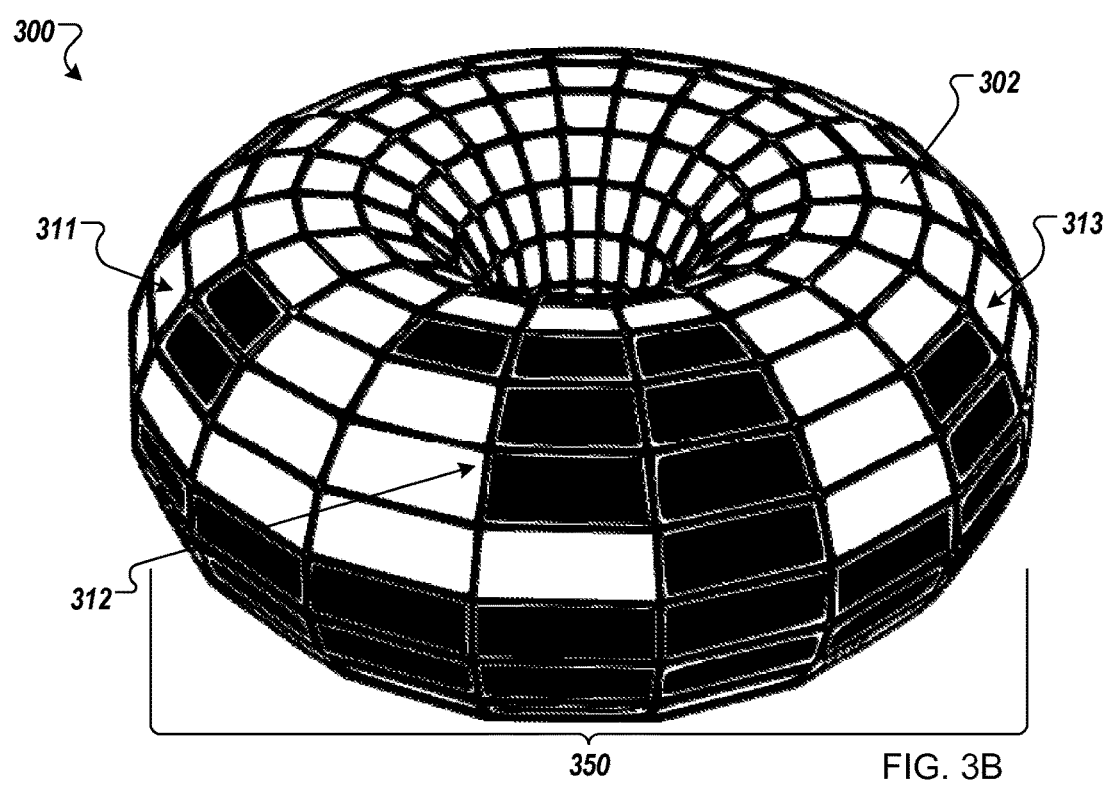

FIGS. 3A-3B are diagrams of an example Boolean space 300 expressed as a torus. In some implementations, the three-dimensional torus shape can provide a more comprehensive representation of a Karnaugh map than can be provided by a two-dimensional representation, such as the Karnaugh map 200 of FIG. 2. In this representation, the number of cubes around the donut is $2^n$, and the number of cubes around the cylinder of the donut is $2^m$. The numbers "n" and "m" are typically greater than 2, and in some cases they are much larger. Computer-implemented analysis and computer-generated graphical representations are often useful or even necessary for cases involving larger numbers of variables (e.g., when(n+m) is very large).

The Boolean space 300 is subdivided into a collection of regions 302. Each of the regions 302 represents an independent description of a logic domain. In the context of applying Boolean algebra to legal analysis, collections of one or more of the regions 302 represents the intellectual property space occupied by one independent claim. In the illustrated example, a region 311 represents the claim of Company #1, a region 312 represents the claim of Company #2, and a region 313 represents the claim of Company #3. With the regions 311, 312, and 313 mapped to the Boolean space 300, it can be seen that large regions of the space 300 remain unclaimed.

Each of the regions 302 exists within one row and one column, and each row and column corresponds to a unique binary value. For example, a region 320 can be associated with a binary row value of "0000", a region 321 can be associated with a binary row value of "0001", a region 322 can be associated with a binary row value of "0010", and a region 323 can be associated with a binary row value of "0011", and the regions 320, 321, 322, and 323 can all be associated with a binary column value "00000" and a region 324 can be associated with the binary row value "0000" and a binary column value of "00001". In the illustrated example, all of the regions can be identified by a unique 9-bit address, although in other examples and appropriate number of bits may be used to represent any corresponding number of rows and columns.

In some implementations, the Boolean space 300 may be presented as a graphical user interface on a computer-based system. For example, the Boolean space 300 may be viewed and manipulated (e.g., the torus can be rotated, regions can be selected or deselected) by a user interacting with a mouse, display, touchscreen, or other appropriate computer interfaces.

Referring now to FIG. 3B, the Boolean map 300 is shown with a collection 350 of the regions 302 highlighted. For example, in a computer-based embodiment of the map 300, a user may spin and roll the torus to view various ones of the regions 302, and can use a mouse or other input to click or otherwise select various ones of the regions 302. In some implementations, the selected regions, such as the collection 350, may be used as an input for further operations. For example, the user may select the regions 302 in the collection 350 because they do not interest or overlap the regions 311, 312, 313, and as such may represent claim space not covered by the claims belonging to Companies #1, #2, or #3. In some implementations, the collection 350 can be further analyzed to determine claims that cover the combinations of features represented by the collection 350. For example, a Boolean equation that describes the collection 350 can be determined, simplified, and transformed from an algebraic representation to an equivalent grammatical representation. In some examples, the aforementioned analysis and determinations may be performed by a computer or other device.

Figure 4:
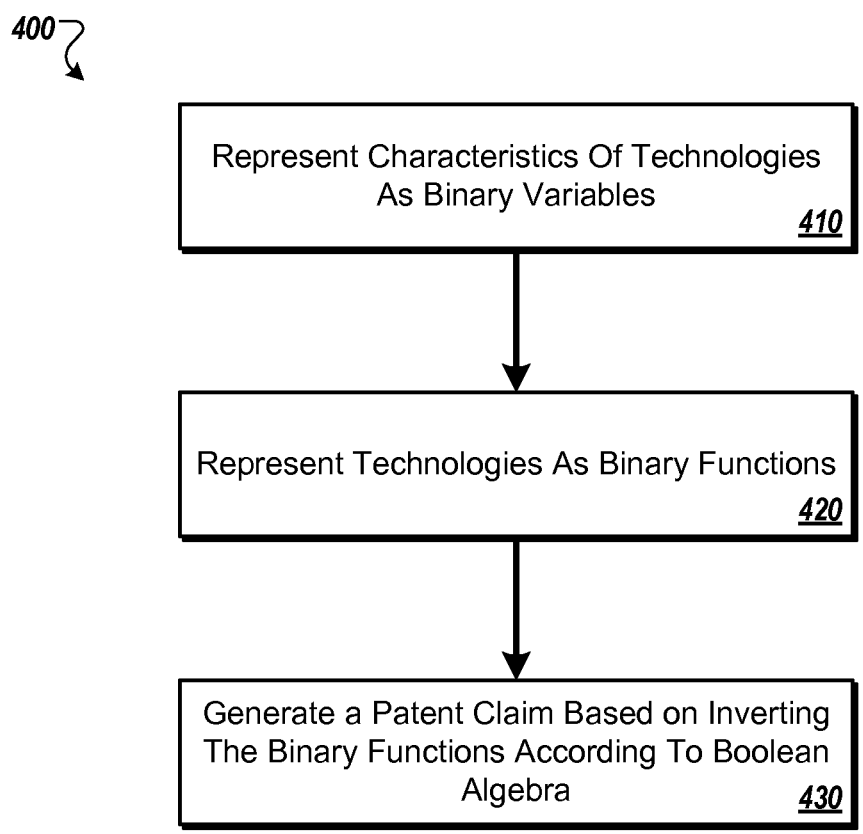
FIG. 4 is a flow diagram of an example process for using Boolean algebra for patent claim analysis and mapping.

FIG. 4 is a flow diagram of an example process 400 for using Boolean algebra for patent claim mapping and analysis. In some implementations, the process 400 can be performed by a computer or other processing device. For example, a computer system may include memory storing instructions that when executed by one or more processing devices to perform the operations of the process 400 and other appropriate functions.

At operation 410, characteristics of a collection of technologies are represented as binary variables. Each of the technologies includes a respective subset of the characteristics. For example, a "valve seat" can be represented as a binary variable "a", the characteristic "carbide" can be represented as a binary variable "b", and "not carbide" can be represented as a binary variable "b".

At operation 420, the collection of technologies is represented as a collection of binary functions, each of which includes a respective subset of the binary variables. For example, "valve seat, formed of carbide, used in a pump that is used for fracturing" can be represented as "(abcd)", and "valve seat, not formed of carbide, used in a pump that is used for fracturing" can be represented as "(ab'cd)".

At operation 430, a patent claim is generated based on inverting the binary functions according to Boolean algebra. In some implementations, generating the patent claim can include generating a new patent claim that differs in scope from one or more prior patent claims, and the binary functions can represent the prior patent claims. For example, "(abcd)" can be inverted as "(a'+b'+c'+d')". One or more patent claims can be generated based on the inverted solution. For example, a patent claim drawn to "valve seat, formed of carbide, not used in a pump" or "valve seat, not formed of carbide, used in a pump used for fracturing" can be generated based on the inversion. In some cases, the resulting inverse of the existing claims can be superimposed on another claim. As an example, with reference to FIG. 2, a claim covering the spaces 230 and 220 can be superimposed on a claim covering space 220. In some instances, the superimposed claim can be presented, for example, as a primary independent claim of a new patent application.

In some cases, generating a patent claim includes fixing the patent claim in a tangible medium of expression. For example, the patent claim can be fixed in memory by a computer processor storing data in the memory, the patent claim can be fixed on paper by a printer or drafting instrument, or the patent claim can be generated in another manner.

In some implementations, the patent claim can be directed to innovative aspects of an invention, and the binary functions can represent prior art technologies. For example, the regions 211-213 of FIG. 2, represent the prior art technologies of Companies #1-#3.

In some implementations, the process 400 can also include operations for comparing the generated patent claim to a second patent claim, and detecting, based on the comparison, that the second patent claim was generated based on Boolean algebra. For example, if a claim generated by an application of Boolean algebra covers the same or highly similar combination of features recited in another claim, then there may be a high likelihood that the other claim was constructed through an application of Boolean algebra as well.

In some implementations, the binary variables of the process 400 can define a concept domain, the collection of technologies can correspond to a first subspace within the domain, and the patent claim can correspond to a second, non-overlapping subspace within the domain. For example, the Boolean space 300 represents a concept domain relating to the binary variables "a", "b", "c", and "d", which represent the features "valve seats" "carbide", "pumps", and "fracturing". The claimed combinations of these features are represented by the regions 311, 312, and 313. The generated patent claim can be represented by the region 350, which does not overlap any of the regions 311-313.

In some implementations, the collection of binary functions can include a first collection of binary functions, and generating the patent claim can include identifying a second collection of binary functions outside the first subspace, and converting at least one of the second collection of binary functions to a patent claim. For example, the solution "(a'b'+a'c+b'd+abc'+ad+cd)" described in the discussion of FIG. 2 can be translated back into one or more a grammatical representations claiming spaces such as, "not carbide, not valve seat", "not carbide pump", "not valve seat, fracturing" (e.g., use of carbide in a fracturing pump), "carbide valve seat for fracturing" (e.g., the pump is not needed), "carbide for fracturing", and "pump for fracturing".

In some implementations, the process 400 can also include generating a graphical representation of the concept domain, the graphical representation including a visual indication of the first and second subspaces within the domain. For example, the Boolean space 300 can be displayed by a computer to provide a visual representation of the space 300. The regions 302 can be highlighted to indicate Boolean spaces, such as the regions 311-313, that are occupied by prior art claims, and Boolean spaces, such as the region 350, that are selected for further claiming or other purposes.

In some applications, ranges are well-defined. For example, the range "less than 100," or "greater than 500" can be represented by Boolean variables (e.g., variable "a" can mean less than 100, and variable "b" being more than 500). A new claim can hence be generated using variable "c" to represent the range "between 101 and 499." In some instances, some variables may have fuzzy ranges, which can be accounted for in their binary definition. For example, variables can be used to represent "around 60," "around 50," "big," or "small," where the true boundaries may not be well-defined. In some cases, the boundaries of the spaces represented by the variables are "fuzzy," and fuzzy logic systems can be applied under such circumstances. For example, fuzzy logic systems can be used where the boundaries of two variables would overlap in the true Boolean logic space.

Figure 5:
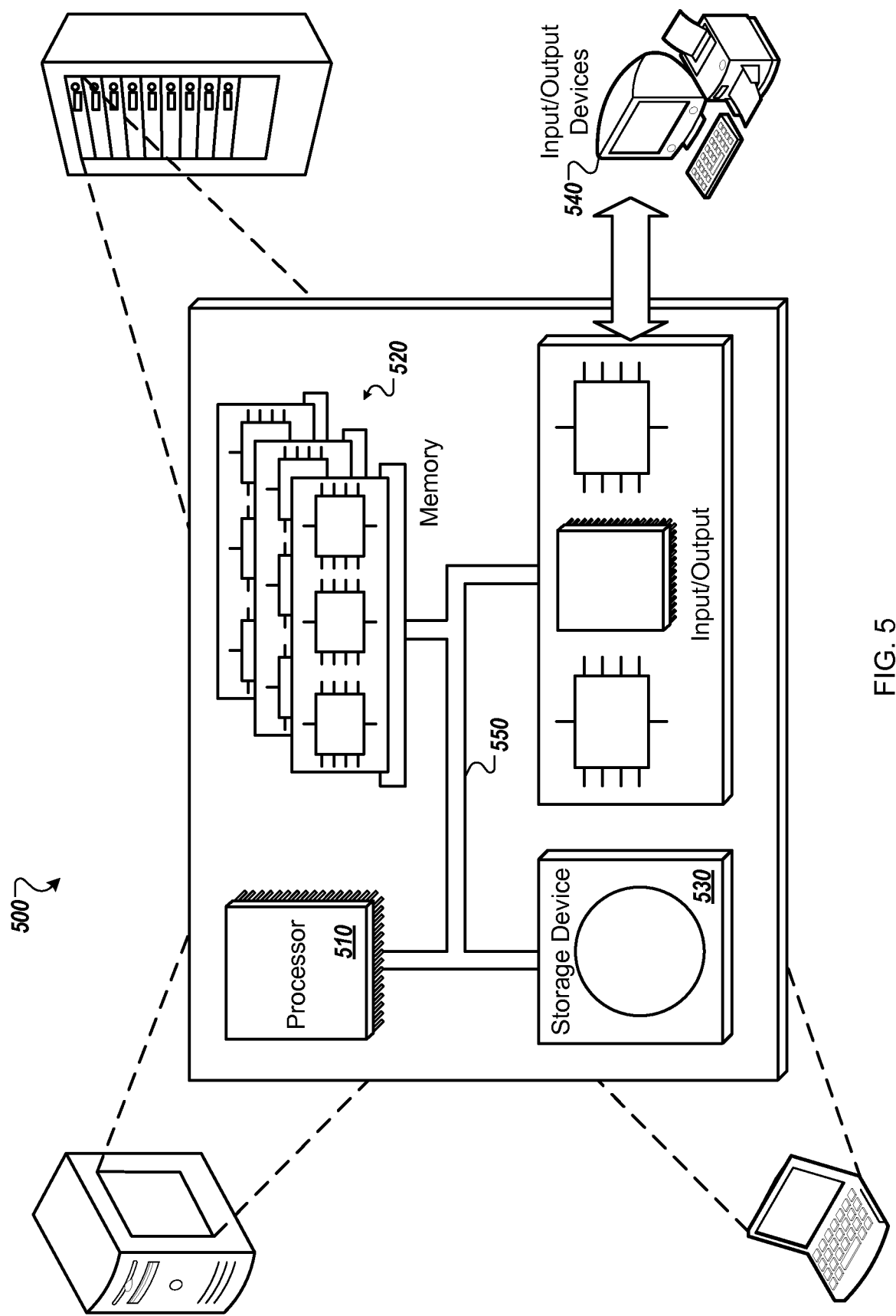
FIG. 5 is a schematic diagram of an example computer system.

FIG. 5 is a schematic diagram of an example computer system 500. In some cases, the system 500 can be used for the operations described above. For example, the system 500 may be used to execute the operations of the process 400 of FIG. 4. In another example, the system 500 may be used to display the map 200 of FIG. 2, or the map 300 of FIGS. 3A and 3B.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. The memory 520 can be a a volatile memory unit, non-volatile memory unit, etc.

The storage device 530 is capable of providing mass storage for the system 500. The storage device 530 can be a hard disk device, an optical disk device, a tape device, etc.

The input/output device 540 provides input/output operations for the system 500. In some implementations, the input/output device 540 includes a keyboard, a pointing device, a display unit for displaying graphical user interfaces, etc.

Some implementations of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
representing limitations of existing patent claims as binary variables by mapping linguistic expressions of the limitations to the binary variables, wherein each of the existing patent claims includes a respective subset of the limitations;
representing the existing patent claims as a plurality of Boolean expressions, wherein each of the Boolean expressions is a subset of the binary variables that are concatenated using Boolean operators;
inverting the Boolean expressions by negating the Boolean expressions; and
translating the inverted Boolean expressions to a subject matter that is not claimed by the existing patent claims, wherein said translating includes reverting the binary variables to the linguistic expressions based on the mapping, modifying the linguistic expressions based on Boolean operators of the inverted Boolean expressions, and excluding at least some of the linguistic expressions that are outside of the subject matter.

2. The method of claim 1, wherein said inverting includes algebraically simplifying the inverted Boolean expressions.

3. The method of claim 1, further comprising generating a new patent claim based on the subject matter, wherein the new patent claim differs in scope from the existing patent claims.

4. The method of claim 3, further comprising:
comparing the new patent claim to a second patent claim; and
detecting, based on the comparison, that the second patent claim was generated based on Boolean algebra.

5. The method of claim 3, wherein the binary variables define a concept domain, the existing patent claims correspond to a first subspace within the domain, and the new patent claim corresponds to a second, non-overlapping subspace within the domain.

6. The method of claim 5, wherein the plurality of Boolean expressions residing in the first subspace comprises a first plurality of Boolean expressions, and generating the new patent claim comprises:
identifying a second plurality of Boolean expressions outside the first subspace; and
converting at least one of the second plurality of binary functions to the new patent claim.

7. The method of claim 5, comprising generating a graphical representation of the concept domain, the graphical representation comprising a visual indication of the first and second subspaces within the domain.

8. The method of claim 1, wherein the modifying includes negating at least one of the linguistic expressions when the at least one linguistic expression is followed by a negation operator, combining the linguistic expressions when the linguistic expressions are connected using a conjunction operator, and separating the linguistic expressions when the linguistic expressions are connected using a disjunction operator.

9. A computer system comprising:
memory storing instructions that are executable; and
one or more processors adapted to execute the instructions to perform operations comprising:
representing limitations of existing patent claims as binary variables by mapping linguistic expressions of the limitations to the binary variables, wherein each of the existing patent claims includes a respective subset of the limitations;
representing the existing patent claims as Boolean expressions, wherein each of the Boolean expressions is a subset of the binary variables that are concatenated using Boolean operators;
inverting the Boolean expressions by negating the Boolean expressions; and
translating the inverted Boolean expressions to a subject matter that is not claimed by the existing patent claims, wherein said translating includes reverting the binary variables to the linguistic expressions based on the mapping, modifying the linguistic expressions based on Boolean operators of the inverted Boolean expressions, and excluding at least some of the linguistic expressions that are outside of the subject matter.

10. The computer system of claim 9, wherein said inverting includes algebraically simplifying the inverted Boolean expressions.

11. The computer system of claim 9, wherein the operations further include generating a new patent claim based on the subject matter, and the new patent claim differs in scope from the existing patent claims.

12. The computer system of claim 11, wherein the binary variables define a concept domain, the existing patent claims correspond to a first subspace within the domain, and the new patent claim corresponds to a second, non-overlapping subspace within the domain.

13. The computer system of claim 12, wherein the operations further include generating a graphical representation of the concept domain, the graphical representation comprising a visual indication of the first and second subspaces within the domain.

14. The computer system of claim 9, wherein the modifying includes negating at least one of the linguistic expressions when the at least one linguistic expression is followed by a negation operator, combining the linguistic expressions when the linguistic expressions are connected using a conjunction operator, and separating the linguistic expressions when the linguistic expressions are connected using a disjunction operator.

15. A non-transitory computer-readable medium storing instruction that are operable, when executed by data processing apparatus, to perform operations comprising:
   representing limitations of existing patent claims as binary variables by mapping linguistic expressions of the limitations to the binary variables, wherein each of the existing patent claims includes a respective subset of the limitations;
   representing the existing patent claims as a plurality of Boolean expressions, wherein each of the Boolean expressions is a subset of the binary variables that are concatenated using Boolean operators;
   inverting the Boolean expressions by negating the Boolean expressions; and
   translating the inverted Boolean expressions to a subject matter that is not claimed by the existing patent claims, wherein said translating includes reverting the binary variables to the linguistic expressions based on the mapping, modifying the linguistic expressions based on Boolean operators of the inverted Boolean expressions, and excluding at least some of the linguistic expressions that are outside of the subject matter.

16. The non-transitory computer-readable medium of claim 15, wherein said inverting includes algebraically simplifying the inverted Boolean expressions.

17. The non-transitory computer-readable medium of claim 15, wherein the operations further include generating a new patent claim based on the subject matter, and the patent claim differs in scope from the existing patent claims.

18. The non-transitory computer-readable medium of claim 17, the operations further comprising:
   comparing the new patent claim to a second patent claim; and
   detecting, based on the comparison, that the second patent claim was generated based on Boolean algebra.

19. The non-transitory computer-readable medium of claim 17, wherein the binary variables define a concept domain, the existing patent prior art claims correspond to a first subspace within the domain, and the new patent claim corresponds to a second, non-overlapping subspace within the domain.

20. The non-transitory computer-readable medium of claim 18, wherein the operations further include generating a graphical representation of the concept domain, the graphical representation comprising a visual indication of the first and second subspaces within the domain.

* * * * *

UNITED STATES PATENT AND TRADEMARK OFFICE
CERTIFICATE OF CORRECTION

PATENT NO. : 10,628,744 B2
APPLICATION NO. : 15/114521
DATED : April 21, 2020
INVENTOR(S) : Jim B. Surjaatmadja and James Douglas Funkhouser It is certified that error appears in the above-identified patent and that said Letters Patent is hereby corrected as shown below:

In the Specification

In Column 5, Line 59, after --represented as-- delete ""(abed)"" and insert --"(abcd)"--

In Column 6, Line 1, delete ""(abed)"" and insert --"(abcd)"--

Signed and Sealed this
Twenty-third Day of June, 2020

Andrei Iancu
*Director of the United States Patent and Trademark Office*